[11] 3,583,790

[72] Inventor James G. Baker
 Winchester, Mass.
[21] Appl. No. 774,142
[22] Filed Nov. 7, 1968
[45] Patented June 8, 1971
[73] Assignee Polaroid Corporation
 Cambridge, Mass.

[54] VARIABLE POWER, ANALYTIC FUNCTION, OPTICAL COMPONENT IN THE FORM OF A PAIR OF LATERALLY ADJUSTABLE PLATES HAVING SHAPED SURFACES, AND OPTICAL SYSTEMS INCLUDING SUCH COMPONENTS
 13 Claims, 9 Drawing Figs.
[52] U.S. Cl.............................................. 350/184,
 350/189, 350/193, 350/204, 350/215, 350/216, 350/247
[51] Int. Cl........................................... G02b 3/02,
 G02b 13/18, G02b 15/14
[50] Field of Search............................ 350/184, 189

[56] References Cited
 UNITED STATES PATENTS
 2,596,799 5/1952 Tillyer et al.................. 350/189
 3,305,294 2/1967 Alvarez........................ 350/184X

*Primary Examiner*—John K. Corbin
*Attorneys*—Brown and Mikulka, William D. Roberson, Gerald L. Smith and Frederick H. Brustman ABSTRACT: A plurality of refracting plates, which are generally perpendicular to an optic axis along which they are in tandem, have quintic or higher order surfaces that are relatively movable laterally in such a way as to be substantially equivalent in their different selected positions to a plurality of lens elements having different selected dioptric powers and different selected aspheric powers. This plurality of different refracting plates can perform a zoom function by itself or as part of a system having other lens elements. This zoom function relates to change of focal length and to change of Seidel corrections, particularly spherical aberration.

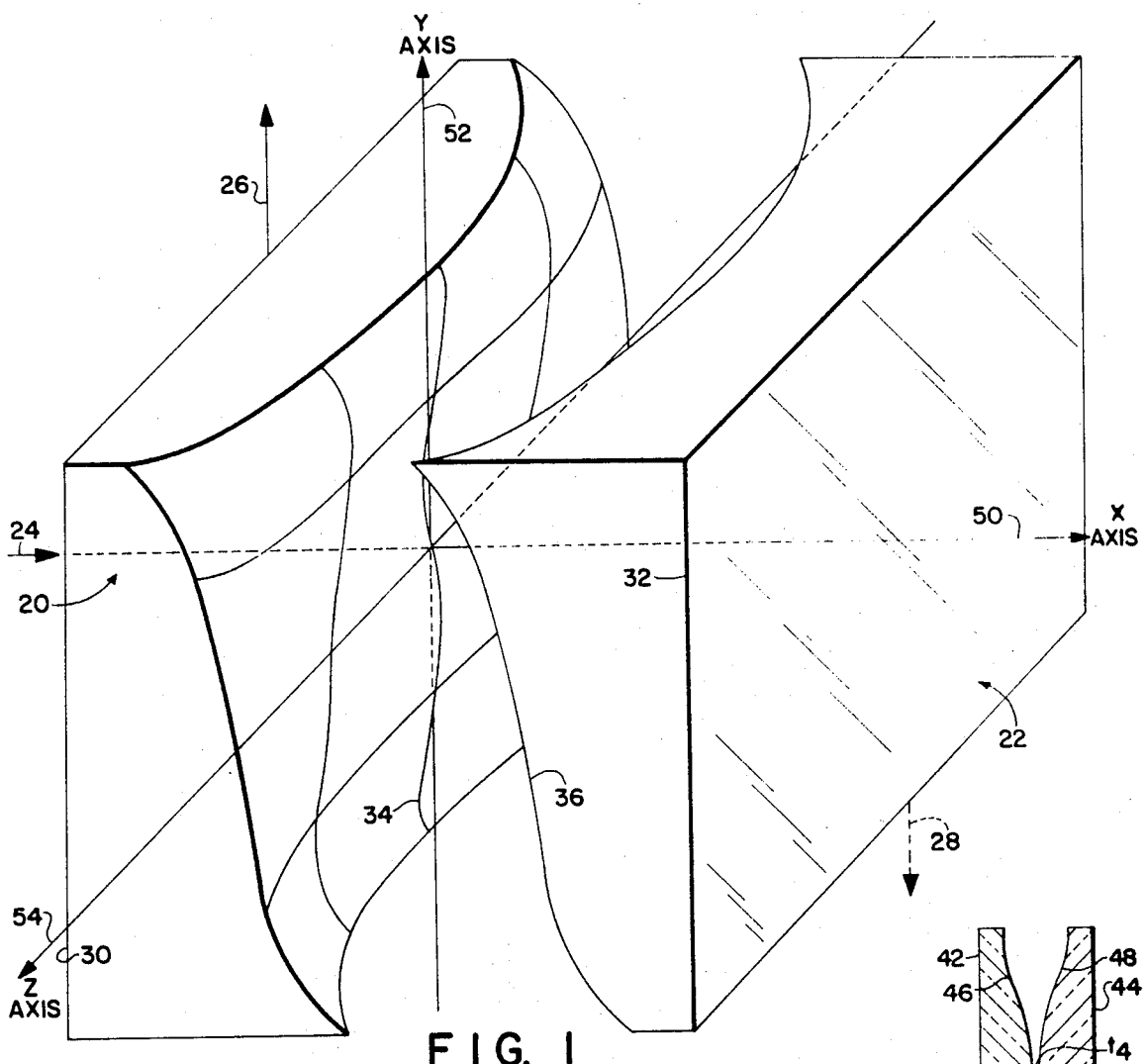
FIG. 1
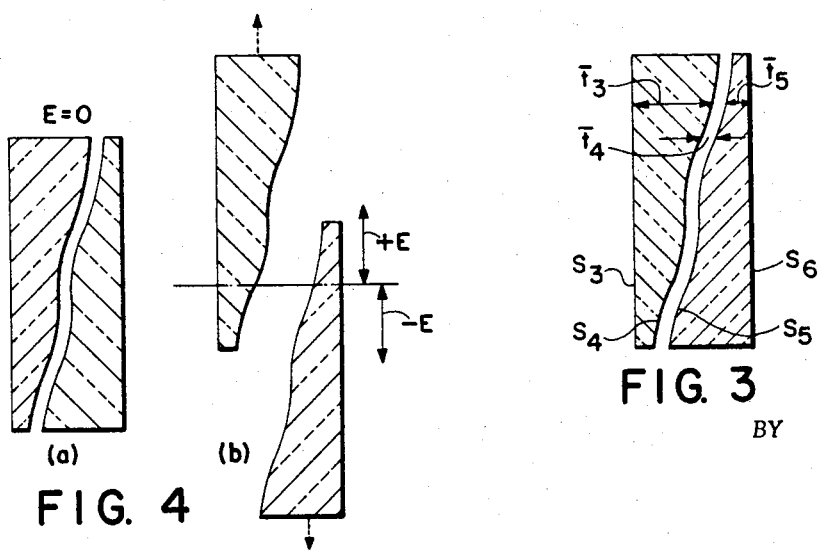
FIG. 4
FIG. 3
FIG. 2
INVENTOR.
JAMES G. BAKER
BY BROWN and MIKULKA
and
GERALD ALTMAN
ATTORNEYS

*INVENTOR.*
JAMES G. BAKER

BY  BROWN and MIKULKA
and
GERALD ALTMAN
ATTORNEYS

VARIABLE POWER, ANALYTIC FUNCTION, OPTICAL COMPONENT IN THE FORM OF A PAIR OF LATERALLY ADJUSTABLE PLATES HAVING SHAPED SURFACES, AND OPTICAL SYSTEMS INCLUDING SUCH COMPONENTS

BACKGROUND

The present invention relates generally to optical components and systems and, particularly, to variable power optical components and systems in which at least two optical elements are movable with respect to each other in such a way as to permit adjustment of focal length. In one prior zoom arrangement, focal length is varied by moving certain of the lenses relative to others along the optic axis. Although here desired variation in focal length, coupled with good correction of aberrations throughout the range of focal lengths, is achievable, the earlier requirement for axial movement for given correction usually results in inconvenient space requirements. In another prior arrangement (see U.S. Pat. No. 3,305,294, Feb. 21, 1967, in the name of Luis W. Alvarez for Two-Element Variable-Power Spherical Lens), two refracting plates, which are generally perpendicular to an optic axis along which they are in tandem, have shaped surfaces that are relatively movable laterally in such a way as to be substantially equivalent in any one of their different selected positions to any one of a plurality of spherical lenses having different selected dioptric powers. Although here desired variation in focal length, coupled with desirably limited space requirements, is achievable, at any time the arrangement simulates a thin lens system, (one or more contact lenses) which is characterized by relatively poor correction of aberrations.

SUMMARY OF THE INVENTION

The primary object of the present invention is to combine the advantages of excellent correction and limited space requirements, which are respectively associated with conventional zoom arrangements and laterally movable curved plates. The structure of the present invention comprises at least two laterally adjustable plates having particular curved surfaces that simulate a thin lens system (one or more contact lenses), which system is characterized by superimposed aspheric powers, by which improved correction is feasible. Specifically, the plates are characterized by at least two surfaces, generally perpendicular to the optic axis, each being defined by a function of at least the fifth order. Each of the plates disclosed below has a surface characterized by the following function:

$$x = ay + cy^3 + 3cyz^2 + gy^5 + 10/3 gy^3az^2 + 5gyz^4$$

wherein the variables $x$, $y$ and $z$ are spatial dimensions to be defined later. These plates, when combined in a lens system, for example a triplet, permit varying the focal length while maintaining good correction throughout a wide range, particularly for spherical aberration.

Other objects of the present invention will in part be obvious and will in part appear hereinafter.

The invention accordingly comprises the optical systems and components, together with their elements and relationships, which are exemplified in the following disclosure, the scope of which will be indicated in the appended claims.

BRIEF DESCRIPTION OF DRAWINGS

For a fuller understanding of the nature and objects of the present invention, reference is to be had to the following specification, taken in connection with the accompanying drawing, wherein:

FIG. 1 illustrates, in exaggerated and partly broken away perspective, a pair of plates constructed in accordance with the present invention;

FIG. 2 illustrates a cross-sectional view of an aspheric duplet of a type simulated by the plates of FIG. 1, when in any selected relative position, with designated optical dimensions;

FIG. 3 illustrates a cross-sectional view of pair of plates of the type shown in FIG. 1, with designated optical dimensions;

FIGS. 4(a) and (b) illustrate cross-sectional views of the pair of plates of FIG. 3, demonstrating certain optical relationships;

DETAILED DESCRIPTION

Figure 5:
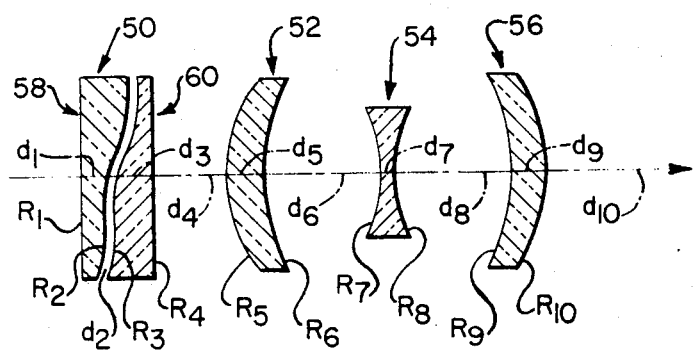
FIG. 5 is a schematic cross-sectional view of an optical system embodying the present invention.

As shown in FIG. 1, the illustrated variable power lens comprises two thin plates 20, 22 disposed in tandem, one behind the other, along an optic axis 24. Optic axis 24 is substantially normal to the surfaces of plates 20, 22 and passes substantially through their centers. These plates are constrained by mechanical means (not shown) for transverse symmetrical movement with respect to the optic axis as at 26, 28. The outside faces 30, 32 of plates 20, 22, respectively, are flat and the inside faces 34, 36, which are spaced apart, are shaped reciprocally. The mathematical expressions for surfaces 34, 36 will be given below. As will be explained, plates 20, 22, at any selected relative transverse positions, are optically equivalent (within acceptable approximation) to a selected duplet with aspheric powers. As shown in FIG. 2, this duplet consists of a symmetric pair of aspheric lenses 38, 40 having outer plane surfaces 42, 44 and inner aspheric surfaces 46, 48. It will be understood that alternatively, the equivalent optical configuration includes three or more lenses in contact in addition to the duplet.

In order to define the parameters of surfaces 34, 36 of plates 20, 22, it is convenient to use a rectangular coordinate system of mutually perpendicular axes $x$, $y$, $z$. The optic axis 24 is taken to be in the $x$-direction (positive to the right) and the plate thicknesses are measured along lines in the $x$-direction. The plate displacements are taken to be in the $y$-direction (positive upward) and the displacement increments $E$ and $-E$ are measured in the $y$-direction as at 26, 28 in FIG. 1. The $z$-direction (positive out of the sheet of drawing toward the reader) is perpendicular to the $x$-direction and the $y$-direction. The $x$, $y$, $z$ axes in the $x$, $y$, $z$ directions, respectively, are shown in FIG. 1 at 50, 52, 54, respectively. In accordance with the present invention, the shape of each of surfaces 34, 36 is characterized by the following quintic expression:

$$x = ay + cy^3 + 3cyz^2 + gy^5 + 10/3 gy^3az^2 + 5gyz^4$$

where $a$, $c$ and $g$ are constants and the origin of the coordinate system is at the vertex of the pertinent surface.

The development of this expression involves first deriving an expression for the total glass thicknesses at various heights of the aspheric duplet of FIG. 2, next deriving an expression for the total glass thicknesses at various heights of the plates, which intuitively have been chosen to have quintic surfaces 34, 36, and then, combining the two expressions. Contours of aspheric and quintic surfaces are shown exaggerated in the drawings for illustrative purposes. Since the mathematical parameters and the optical significance of the first expression are known, the mathematical parameters for the like optical significance of the second expression can be evaluated. In the embodiment illustrated in FIG. 1, the characterizing expression is symmetrical with respect to the origin in any plane parallel to the $x$, $y$ plane ($x$ changes sign when $y$ changes sign, for any assigned value of $z$) and is mirror symmetrical in any plane parallel to the $x$, $z$ plane ($x$ retains sign when $z$ changes sign, for any assigned value of $y$).

This derivation follows. In reference to FIG. 7: $R_3$, $R_4$, $R_5$, $R_6$ refer to the radii of surfaces at the vertices of the equivalent duplet ($R_3 = R_6 = \infty$, i.e. plano); $B_4$, $B_5$ refer to aspheric coefficients such that $B_4=B_5=0$ for spherical surfaces, $t_3$, $t_4$, $t_5$ refer to designated distances between these surfaces at various heights, and $d_3$ and $d_5$ refer to thicknesses of lenses 38, 40, respectively, at their vertices. In reference to FIG. 3: $S_3$, $S_4$, $S_5$, $S_6$ refer to the designated surfaces; and $\bar{t}_3$, $\bar{t}_4$, $\bar{t}_5$ refer to designated distances between these surfaces at various heights.

In accordance with the foregoing, it can be shown, in reference to FIG. 2, that:

$$t_3 = d_3 + \frac{1}{2R_4}(y^2+z^2) + \left(\frac{1}{8R_4^3}+B_4\right)(y^2+z^2)^2$$

$$t_5 = d_5 - \frac{1}{2R_5}(y^2+z^2) - \left(\frac{1}{8R_5^3}+B_5\right)(y^2+z^2)^2$$

$$T = t_3 + t_5$$

$$= (d_3+d_5) + \frac{1}{2}\left(\frac{1}{R_4}-\frac{1}{R_5}\right)(y^2+z^2)$$

$$+ \left[\frac{1}{8}\left(\frac{1}{R_4^3}-\frac{1}{R_5^3}\right)+B_4-B_5\right](y^2+z^2)^2$$

Also, it can be shown, in reference to Figs. 3 and 4, that:

$$\bar{t}_3 = \bar{d}_3 + a(y+E) + bz + c(y+E)^3 + d(y+E)^2z$$
$$+ e(y+E)z^2 + fz^3$$
$$+ g(y+E)^5 + h(y+E)^4z$$
$$+ i(y+E)^3z^2 + j(y+E)^2z^3$$
$$+ k(y+E)z^4 + lz^5$$

$$\bar{t}_5 = \bar{d}_5 - a(y-E) - bz - c(y-E)^3 - d(y-E)^2z$$
$$- e(y-E)z^2 - fz^3$$
$$- g(y-E)^5 - h(y-E)^4z$$
$$- i(y-E)^3z^2 - j(y-E)^2z^3$$
$$- k(y-E)z^4 - lz^5$$

$$\bar{T} = \bar{t}_3 + \bar{t}_5$$

$$= \bar{d}_3 + \bar{d}_5 + 2aE + 6cy^2E + 2cE^3 + 4dyzE$$
$$+ 2ez^2E + 10gy^4E + 20gy^2E^3$$
$$+ 2gE^5 + 8hy^3zE + 8hyzE^3$$
$$+ 6iy^2z^2E + 2iz^2E^3 + 4jyz^3E$$
$$+ 2kz^4E$$

In order to obtain a surface of revolution:

$$(d_3+d_5) = \bar{d}_3 + \bar{d}_5 + 2aE + 2cE^3 + 2gE^5 = \text{constant}$$

$$\frac{1}{2}\left(\frac{1}{R_4}-\frac{1}{R_5}\right) = 6cE + 20gE^3 = M$$

$$\frac{1}{2}\left(\frac{1}{R_4}-\frac{1}{R_5}\right) = 2eE + 2iE^3 + \Delta E^3 = M$$

$$\left[\frac{1}{8}\left(\frac{1}{R_4^3}-\frac{1}{R_5^3}\right)+(B_4-B_5)\right] = 10gE = N$$

$$\left[\frac{1}{8}\left(\frac{1}{R_4^3}-\frac{1}{R_5^3}\right)+(B_4-B_5)\right] = 3iE = 2N$$

$$\left[\frac{1}{8}\left(\frac{1}{R_4^3}-\frac{1}{R_5^3}\right)+(B_4-B_5)\right] = 2kE = N$$

where $M$ and $N$ are coefficients of the $(y^2+z^2)$ term and of the $(y^2+aq2)2$ terms respectively and $d=h=j=0$ (a necessary condition for rotational symmetry).

In the foregoing set of equations, $\Delta$ is a small error term equal to $40/3 \, g$, which becomes significant only for very large lateral displacements, at which substantially exact rotational symmetry can be only approximately achieved as a practical matter. Also $a$ can be zero or can be used to balance $2a$ against $(2cE 2+2gE^4)$. Optionally $b=f=l=0$ or any arbitrary constants. Therefore $e=3c$
$k=5g$
$i=10/3g$
$\Delta=40/3g$ (Specifically, $\Delta$ causes departure error from the surface of revolution and $\Delta T = -40/3 g z^2 E^3$)

By substitution, the essential form of the curve, with the origin at the vertex, is:

$$x = ay + cy^3 + 3cyz^2 + gy^5 + 10/3 grz^2 + 5gyz^4$$

From the above explanation, one can appreciate $a$ as a constant representing the coefficient of a prism which can be removed to minimize the thickness of said component, $c$ is a constant related to lens power variation with displacement $E$ in the $y$ direction and $g$ is a constant selected to superimpose predetermined aspheric power on said component in relation to displacement in the $y$ direction.

The Combined Analytic Function Component And Triplet Of FIG. 5 (Quintic Elements Only Being Movable)

FIG. 5 illustrates a triplet embodying the present invention. This triplet comprises a forward analytic function component 50, a positive meniscus lens element 52, a double concave lens element 54 and a positive meniscus lens element 56. Function component 50 includes elements 58, 60, which are movable oppositely and transversely in order to vary overall focal length. In accordance with the present invention, the contiguous surfaces of elements 58, 60 are of the quintic configuration discussed above. Because this analytic function element corresponds to a pair of lenses, the degree of design freedom is sufficiently great to allow for a wide variation in focal length and for correction, particularly for spherical aberration, throughout the range of variation. It will be understood that, in the embodiment of FIG. 5, all elements are composed of glass, plastic or cubic crystal.

The optical configuration of the elements of the optical system of FIG. 5 is presented numerically in the following table, in which values of radius ($R$) and of distance ($d$) are in terms of unit focal length. In this system, lens elements 52, 54, 56 are static, i.e. do not move.

TABLE 1

[With Reference To Fig. 5]

| Lens or airspace | Radius | Thickness or spacing | Index of refraction ($N_d$) | Abbé Number ($V_d$) |
|---|---|---|---|---|
| 58 | $R_1$=plano | $d_1$=0.0240 | 1.501 | 56.4 |
|  | $R_2$=quintic (var.) |  |  |  |
| Airspace |  | $d_2$=0.0020 |  |  |
| 60 | $R_3$=quintic (var.) | $d_3$=0.0240 | 1.501 | 56.4 |
|  | $R_4$=plano |  |  |  |
| Airspace |  | $d_4$=0.0040 |  |  |
| 52 | $R_5$=0.1794 | $d_5$=0.0160 | 1.788 | 50.5 |
|  | $R_6$=0.4930 |  |  |  |
| Airspace |  | $d_6$=0.0102 |  |  |
| 54 | $R_7$=-0.2887 | $d_7$=0.0080 | 1.573 | 42.6 |
|  | $R_8$=0.2179 |  |  |  |
| Airspace |  | $d_8$=0.0178 |  |  |
| 56 | $R_9$=-1.2281 | $d_9$=0.0150 | 1.697 | 56.2 |
|  | $R_{10}$=-0.2217 |  |  |  |

In the foregoing table, the rear image distance is 0.9678. The position ($t_N'$) of the image of the real stop as seen from the back of the lens system is such that $t_N'$=And the reciprocal of the object distance ($1/s_1$) at the null positions of quintic elements 58, 60 ($E$=0.000) is such that $1/s_1$=0.080.

A tabulation of focusing data of the system of FIG. 5, in terms of the discussion of the family of equivalent duplets of FIG. 2 above, as quintic elements 58, 60 move transversely, is as follows:

TABLE 2

[With Reference To Fig. 5]

| $1/s_1$ | 0.0 | 0.04 | 0.08 | 0.320 | 0.500 |
|---|---|---|---|---|---|
| $c_2$ | 0.077096 | 0.037042 | 0.000000 | -0.234917 | -0.409935 |
| $c_1$ | -0.077096 | -0.037042 | 0.000000 | 0.234917 | 0.409935 |
| $B_2$ | -6.189077 | -6.195517 | -6.199967 | -6.231653 | -6.243864 |
| $B_1$ | 6.189077 | 6.195517 | 6.199967 | 6.231653 | 6.243864 |
| $d_N$ | 0.9662 | 0.9656 | 0.9678 | 0.9678 | 0.9677 |

Note: $f$=0.991092.

Table 3, below, illustrates, in terms of Seidel values, the operation of the optical system of FIG. 5 (spacings between the elements held constant) as analytic function elements 58, 60 are moved to various transverse positions in the manner of FIG. 4. The positional relationships of these analytic function elements is designated by the reciprocal of the front focal distance (1/s), all in terms of unit length.

TABLE 3
[With Reference To Fig. 5]

| 1./s | 0.00 | 0.04 | 0.08 | 0.32 | 0.50 |
|---|---|---|---|---|---|
| Spherical aberration | 1.503 | 1.504 | 1.500 | 1.500 | 1.500 |
| Coma | .000 | −.000 | +.001 | +0.51 | +.130 |
| Astigmatism | −.039 | −.019 | −.000 | +.109 | +.181 |
| ½ Petzval sum | +.044 | +.055 | +0.70 | +.149 | +.208 |
| Distortion | −.019 | −.012 | +.006 | −.035 | −.065 |

It will be observed in Table 3 that, as the object distance decreases, spherical aberration remains fixed, inward coma increases slightly, astigmatism and Petzval curvature become undercorrected but within acceptable limits and distortion changes mildly from barrel to pincushion.

Figure 6:
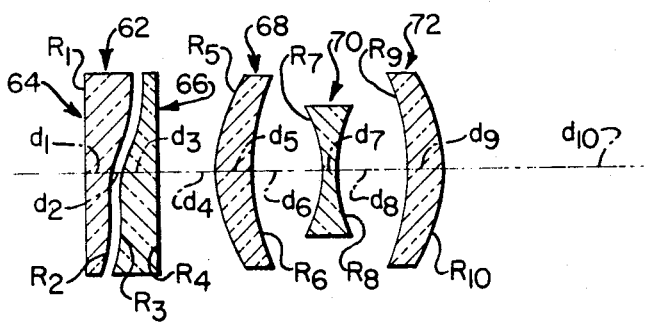
FIG. 6 is a schematic cross-sectional view of another optical system embodying the present invention.

The Combined Analytic Function Component And Triplet Of FIG. 6—Embodiment I (Modification Of The System Of FIG. 5 With First Lens Only, Axially Movable)

Tables 4 and 5, below, illustrate the operation of the optical system of FIG. 6, which is a modification of the system of FIG. 5 with the first lens element axially movable. This system comprises a quintic component 62 including quintic elements 64, 66, a positive meniscus lens 68, a double concave negative lens 70 and a positive meniscus lens 72, all analogous to their counterparts in FIG. 5. In this embodiment, lens element 68 is movable axially and quintic elements 64, 66 are movable transversely. In the following table, variable spacings $d_4$ and $d_6$ are given in relation to reciprocal object distances, all in terms of unit length. Since only element 68 is axially movable, only spacings $d_4$ and $d_6$ vary and $\Delta d_6 = \Delta d_4$. The focusing data of this table also relates to the family of equivalent duplets of FIG. 2 above.

TABLE 4
[With Reference To Fig. 6—Embodiment I]

| 1./s₁ | 0.0 | 0.04 | 0.08 | 0.320 | 0.500 |
|---|---|---|---|---|---|
| $c_2$ | 0.069885 | 0.034948 | 0.000000 | −0.212979 | −0.375683 |
| $c_3$ | −0.069885 | −0.034948 | 0.000000 | 0.212979 | 0.375683 |
| $d_4$ | 0.005120 | 0.004557 | 0.004013 | 0.001188 | (−0.000404) |
| $d_6$ | 0.009091 | 0.009654 | 0.010199 | 0.013023 | 0.014615 |
| $B_2$ | −6.374434 | −6.286481 | −6.202102 | −5.771172 | −5.527697 |
| $B_3$ | 6.374434 | 6.286481 | 6.202102 | 5.771172 | 5.527697 |
| $d_N$ | 0.9678 | 0.9678 | 0.9678 | 0.9678 | 0.9678 |

NOTE: $f = 0.989538$.

Table 5, below, illustrates in terms of Seidel values, the operation of the optical system of FIG. 6, with first lens element 68 axially movable, as analytic function elements 64, 66 are moved to various transverse positions in the manner of FIG. 4. The relative positions of the movable elements are related to reciprocal object distance values (1/s), all in terms of unit focal length.

TABLE 5
[With Reference To Fig. 6—Embodiment I]

| 1./s | 0.00 | 0.04 | 0.08 | 0.32 | 0.50 |
|---|---|---|---|---|---|
| Spherical aberration | 1.500 | 1.500 | 1.500 | 1.500 | 1.500 |
| Coma | −.039 | −.020 | +.000 | +.138 | +.258 |
| Astigmatism | −.021 | −.011 | +.000 | +.064 | +.111 |
| ½ Petzval sum | +.046 | +.058 | +.070 | +.142 | +.196 |
| Distortion | +.022 | +.014 | +.006 | −.041 | −.075 |

It will be observed in Table 5 that, as the front focal length decreases, the Seidel values for spherical aberration, astigmatism and Petzval field curvature vary less than do the corresponding Seidel values of Table 3.

The Combined Analytic Function Component And Triplet Of FIG. 6—Embodiment II (Modification Of FIG. 5 With All Lenses But Not Quintic Component Axially Movable)

Tables 6 and 7, below, in analogy to Tables 4 and 5, illustrate the operation of a modification of the optical system of FIG. 5, with lens elements 68, 70, 72 movable axially such that spacings $d_4$, $d_6$, $d_8$, $d_{10}$ vary as follows, the overall length being kept constant at 1.088831. In Table 6, these spacings are given in relation to reciprocal object distances, all in terms of unit length.

TABLE 6
[With Reference To Fig. 6—Embodiment II]

| 1./s₁ | 0.0 | 0.04 | 0.08 | 0.320 | 0.500 |
|---|---|---|---|---|---|
| $c_2$ | 0.064752 | 0.032015 | 0.000000 | −0.169189 | −0.330751 |
| $c_3$ | −0.064752 | −0.032015 | 0.000000 | 0.169189 | 0.330751 |
| $d_4$ | −0.000110 | 0.001831 | 0.004036 | 0.038998 | 0.054442 |
| $d_6$ | 0.008537 | 0.009281 | 0.010209 | 0.023793 | 0.028380 |
| $d_8$ | 0.013111 | 0.015553 | 0.017798 | 0.027338 | 0.027701 |
| $d_{10}$ | 0.978297 | 0.973166 | 0.967792 | 0.909700 | 0.889308 |
| $B_2$ | −6.690805 | −6.454638 | −6.199915 | −3.822963 | −3.234865 |
| $B_3$ | 6.690805 | 6.454638 | 6.199915 | 3.822963 | 3.234865 |

NOTE: $f = 1.006645$.

In Table 7, the Seidel values for the sequence of reciprocal object distances are given.

TABLE 7
[With Reference To Fig. 6—Embodiment II]

| 1./s | 0.00 | 0.04 | 0.08 | 0.32 | 0.50 |
|---|---|---|---|---|---|
| Spherical aberration | 1.500 | 1.500 | 1.500 | 1.500 | 1.500 |
| Coma | .000 | −.000 | +.000 | +.002 | +.104 |
| Astigmatism | +.011 | +.005 | +.000 | −.030 | +.025 |
| ½ Petzval sum | +.048 | +.059 | +.070 | +.127 | +.181 |
| Distortion | −.001 | +.003 | +.006 | −.057 | −.120 |

It will be observed in Table 6 that the Seidel values are practically constant, particularly in the case of spherical aberration which is actually constant, with small coma, astigmatism, field curvature and distortion, throughout a very wide range of object distances. This range for example, extends from infinity to 10 inches for the lens of FIG. 6.

The Combined Analytic Function Component And Triplet Of FIG. 6— Embodiment III (Modification Of FIG. 5 With All Lenses And Quintic Component Axially Movable)

Tables 8 and 9 below, in analogy to Tables 4 and 5, illustrate the operation of a modification of the optical system of FIG. 5, with lens elements 68, 70, 72 and quintic components 64 all movable axially such that spacings $d_4$, $d_6$, $d_8$, $d_{10}$ vary. In Table 8, these spacings are given in relation to reciprocal front focal distances, all in terms of unit length.

Figure 7:
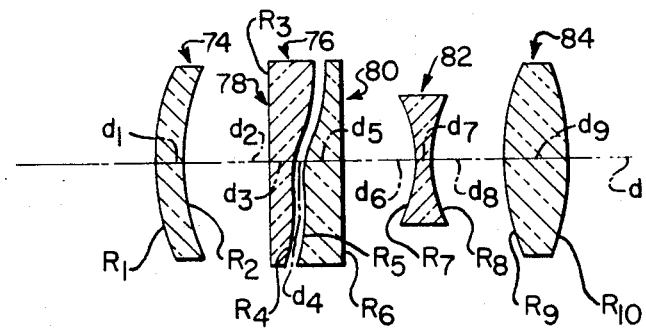
FIG. 7 is a schematic cross-sectional view of a further optical system embodying the present invention.

TABLE 8
[With Reference To Fig. 7—Embodiment III]

| 1./s₁ | 0.0 | 0.04 | 0.08 | 0.320 | 0.500 |
|---|---|---|---|---|---|
| $c_2$ | 0.051704 | 0.025570 | 0.000000 | −0.139862 | −0.237994 |
| $c_3$ | −0.051704 | −0.025570 | 0.000000 | 0.139862 | 0.237994 |
| $d_1$ | 0.000898 | 0.002410 | 0.004036 | 0.020960 | 0.057480 |
| $d_6$ | 0.008894 | 0.009490 | 0.010209 | 0.018252 | 0.030046 |
| $d_8$ | 0.014080 | 0.016018 | 0.017798 | 0.025649 | 0.026493 |
| $d_{10}$ | 0.959960 | 0.963925 | 0.967792 | 0.982971 | 0.969808 |
| $B_2$ | −6.588983 | −6.399973 | −6.199915 | −4.632168 | −3.057237 |
| $B_3$ | 6.588983 | 6.399973 | 6.199915 | 4.632168 | 3.057237 |
| $\Sigma d_i$ | 1.072831 | 1.080831 | 1.088831 | 1.136831 | 1.172831 |

NOTE: $f = 0.988222$.

In Table 9, the Seidel values for the sequence of reciprocal front focal surface are given.

TABLE 9
[With Reference To Fig. 6—Embodiment III]

| 1./s | 0.00 | 0.04 | 0.08 | 0.32 | 0.50 |
|---|---|---|---|---|---|
| Spherical aberration | 1.500 | 1.500 | 1.500 | 1.500 | 1.500 |
| Coma | −.000 | −.000 | +.000 | +.001 | +.021 |
| Astigmatism | +.009 | +.004 | +.000 | −.025 | −.028 |
| ½ Petzval sum | +.053 | +.061 | +.070 | +.117 | +.150 |
| Distortion | +.000 | +.004 | +.006 | −.021 | −.119 |

It will be observed in Table 9 that the Seidel values are practically constant, particularly in the case of spherical aberration, which actually is constant, with small coma, astigmatism, field curvature and distortion, throughout a very wide range of object distances. The overall length of the lens system is compact, notwithstanding an external shutter and spherical dioptric elements.

Example Of Calculations Of Quintic Surface (As Applied To System Of FIG. 6)

An example of the calculation of the surfaces of a typical pair of plates, in accordance with the present invention follows.

Set the mean reciprocal object distance
$1/s_1 = 0.0$

In this instance, let this be the case when the two plates both have their vertices on the optic axis, i.e.
$E = -E = 0$.

Next by calculation from the equations in reference to FIG. 2:

$c_2 = 0.064752$
$c_3 = 0.064752$
$d_1 =$
$d_3 =$
$B_2 = 6.690805$
$B_3 = 6.690805$
$C_2{}^3 = +0.00027149$
$C_3{}^3 = -0.00027149$

Then, by calculation from the equations in reference to FIGS. 3 and 4:

Set $a = 0$ so that
$+0.00006787 - 13.381610 = +10g^E$

If unit length = 5.000", $E = +1.0$", for example. Here $E = +0.2$ in terms of unit length.

Therefore:
$+0.00006787 - 13.381610 = 2g$

And:
$g = -6.690771$

Thus:
$+0.064752 = +1.2c - 1.070523$
$c = +0.946063$

It follows that the equation for ³quintic surfaces of FIG. 6 is:
$x = +0.946063^3 + 2.838189yz^2 - 6.690771y^5$
$-22.302570Y^3z^2 - 33.454855yz^4$ Here:
$\bar{d}_1 + \bar{d}_3 = 0.0480 = D_1 + D_2 + 0.015137 - 0.004282$
$D_{1+3} = 0.037145$ or
$D_{1=3} = 0.018573$ Subsidiary Calculation Of Typical Points On Surface Specifically, for example, for a typical sagitta:
If $y = +0.2, z = 0$
Then $x = +0.00542746 \to +0.0433$" If $y = +0.2, z = +0.1$ Then $x = +0.00865055 \to 0.0433$"

The Combined Analytic Function Component And Triplet Of FIG. 7

FIG. 7 illustrates a triplet embodying the present invention. This triplet comprises a forward double convex lens 74, a center double concave lens 82, a rearward double convex lens 84, and a quintic component 76, which is positioned between lenses 74 and 82. Quintic component 76 includes elements 78, 80, which are movable transversely relative to the optic axis in order to vary overall focal length. It will be understood that in the embodiment of FIG. 7, all elements are composed of glass, plastic or cubic crystal.

The optical configuration of the elements of the optical system of FIG. 7 is presented numerically in the following table, in which values of radius ($R$) and of distance ($d$) are in terms of unit focal length.

TABLE 10
[With Reference To Fig. 7]

| Lens or airspace | Radius | Thickness or spacing | Index of refraction ($N_d$) | Abbé number ($V_d$) |
|---|---|---|---|---|
| 74 | $R_1 = 0.2211$ | $d_1 = 0.0210$ | 1.788 | 50.5 |
| Airspace | $R_2 = 0.4976$ | $d_2 = 0.0100$ | | |
| 78 | $R_3 =$ plano | $d_3 = 0.0150$ | 1.501 | 56.4 |
| Airspace | $R_4 =$ quintic | $d_4 = 0.0050$ | | |
| 80 | $R_5 =$ quintic | $d_5 = 0.0150$ | 1.501 | 56.4 |
| Airspace | $R_6 =$ plano | $d_6 = 0.0100$ | | |
| 82 | $R_7 = -0.6560$ | $d_7 = 0.0070$ | 1.584 | 37.0 |
| Airspace | $R_8 = +0.2009$ | $d_8 = 0.0390$ | | |
| 84 | $R_9 = +0.6343$ | $d_9 = 0.0180$ | 1.699 | 49.7 |
| | $R_{10} = -0.5218$ | $d_{10} = 0.9102$ | | |

Here $B_7 = +a[9.5, B_8 = -a[0.636$ and the back focal distance is given by $d_{10}$.

A tabulation of focusing data of the system of FIG. 7, in terms of the discussion of the family of equivalent duplets of FIG. 2 above, as quintic elements 78, 80 move transversely, is as follows:

TABLE 11
[With Reference To Fig. 7]

| $1/s_1$ | 0.0 | 0.010 | 0.020 | 0.040 | 0.080 | 0.160 | 0.320 |
|---|---|---|---|---|---|---|---|
| $R_4$ | ∞ | −86.65 | −42.16 | −21.09 | −10.57 | −5.298 | −2.664 |
| $R_5$ | ∞ | +86.65 | +42.16 | +21.09 | +10.57 | +5.298 | +2.664 |
| $B_4$ | −0.000037 | +0.067991 | +0.139674 | +0.278682 | +0.554373 | +1.097948 | +2.156086 |
| $B_5$ | +0.000037 | −0.067991 | −0.139674 | −0.278682 | −0.554373 | −1.097948 | −2.156086 |
| $s_N'$ | 0.9102 | 0.9105 | 0.9102 | 0.9102 | 0.9102 | 0.9102 | 0.9102 |

In the system of FIG. 7, both the image position and spherical aberration correction are compensated.

Example Of Calculations of Quintic Surface (As Applied To System Of FIG. 7)

An example of the calculation of the surfaces of a typical pair of plates, in accordance with the present invention, follows.

Set the mean reciprocal object distance
$1/s = 0.160$

This is the case when the two plates both have their vertices on the optic axis, i.e. $E = -E = 0$ Next, by calculation from the equations in reference to FIG. 2:

$c_2 = 0.188741$ (where $c_2 = 1/R_2$)
$c_3 = 0.188741$ (where $c_3 = 1/R_3$)
$d_1 =$
$d_3 =$
$B_2 = 1.097948$
$B$ Then, by calculation from the equations in reference to FIGS. 3 and 4:

Set $a + 0$ so that
$-0.00168090 = 2.195896 = +10gE$

If unit length = 5.000", $E = -0.50$", for example.
Here $E = -0.10$ in terms of unit length. Therefore:
$-0.00168090 + 2.195896 = -g$ From above:
$g=-2.194215$
Thus:
$-0.188741=-0.6c+0.020 \times 2.194215$
$c=+0.387709$
Thus, the equation for the quintic surfaces of FIG. 7 is:
$x=+0.3877y^3+1.1631yz^2-2.1942y^5$
$-7.3140y^3z^2-yz^4$ Q.E.D.

Subsidiary Calculation Of Typical Points On Surface

Specifically, for example, for a typical sagitta:
For $y=+.2$
$z=0$
Then $x=+0.003102 -0.000702 =+0.002400 \rightarrow +0.012''$
For $y=+.2$
$z=+.1$
Then $x=+0.002400+0.002326-0.000585-0.00029$
$=+0.003922 \rightarrow 0.0196''$

Figure 8:
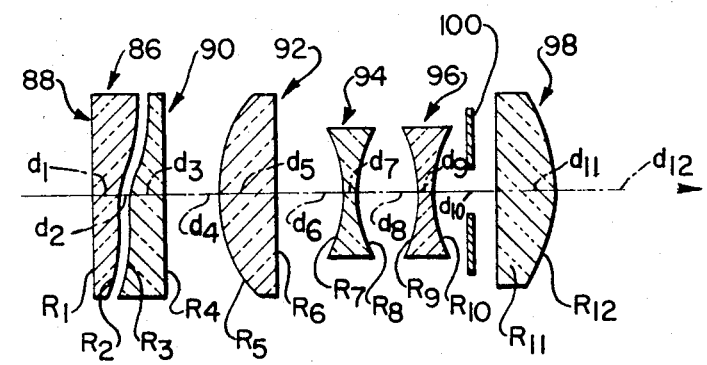
FIG. 8 is a schematic cross-sectional view of another optical system embodying the present invention.

The Combined Analytic Function Component And Quadruplet Of FIG. 8

FIG. 8 illustrates a quadruplet embodying the present invention. This quadruplet comprises a forward analytic function component 86, including analytic function elements 88, 90, a forward positive plano concave element 92, a pair of inner negative double concave lens elements 94, 96 and a rearward positive meniscus lens element 98. The shutter position is indicated at 100 between lens elements 96 and 98. Analytic function elements 88, 90 are movable transversely relative to the optic axis in order to vary overall length.

The optical configuration of the elements of the optical system is presented numerically in the following table, in which values of radius ($R$) and of distance ($d$) are in terms of unit focal length.

TABLE 12
[With Reference To Fig. 8]

| Lens or airspace | Radius | Thickness or spacing | Index of refraction ($N_d$) | Abbé Number ($V_d$) |
| --- | --- | --- | --- | --- |
| 88 | $R_1$=plano | $d_1=0.0240$ | 1.501 | 56.4 |
| Airspace | $R_2$=quintic | $d_2=0.0020$ | | |
| 90 | $R_3$=quintic | $d_3=0.0240$ | 1.501 | 56.4 |
| Airspace | $R_4$=plano | $d_4=0.0040$ | | |
| 92 | $R_5=0.2222$ | $d_5=0.0170$ | 1.697 | 56.2 |
| Airspace | $R_6=-14.80$ | $d_6=0.0125$ | | |
| 94 | $R_7=-1.7114$ | $d_7=0.0080$ | 1.501 | 56.4 |
| Airspace | $R_8=0.3811$ | $d_8=0.0107$ | | |
| 96 | $R_9=-0.3544$ | $d_9=0.0080$ | 1.581 | 40.9 |
| Airspace | $R_{10}=0.3120$ | $d_{10}=0.0278$ | | |
| 98 | $R_{11}=55.23$ | $d_{11}=0.0160$ | 1.697 | 56.2 |
| | $R_{12}=-0.2646$ | $d_{12}=0.9487$ | | |

In the system of FIG. 8, both the image position and the spherical aberration are compensated. The stop position is given by $t_i=-0.1050$.

Figure 9:
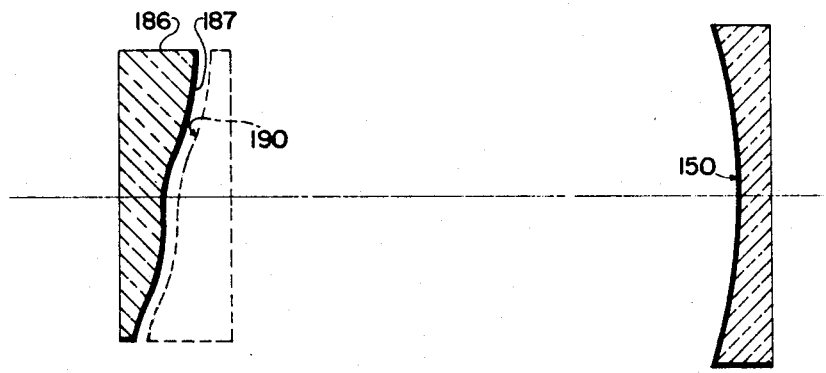
FIG. 9 is a schematic cross-sectional view of an optical system, including a mirror, embodying the present invention.

The present invention thus provides an analytic function element in the form of at least one aspheric refracting plate with a quintic or higher order surface that is relatively movable laterally in such a way as to be substantially equivalent in its different selected positions to at least one of a plurality of lens elements having different selected dioptric powers and different selected aspheric powers. In one modification, see FIG. 9, a single analytic element 186 is placed at the center of curvature of a spherical mirror so that the mirror 150 image of the quintic surface 190 is in contiguity with the actual quintic surface 187. The combination of actual surface 190 and mirror image surface 190 constitutes a laterally movable quintic surface pair analogous to the quintic pairs described above. Such analytic function elements are useful per se as variable lenses and are useful in more complex optical systems where variable focal length with good correction within a small space is desired.

In another modification, the air space between the quintic surfaces, which ordinarily constitutes an error increment that usually is tolerable, is corrected by using slightly different quintic surfaces in contiguity. In a further modification, an air space error increment of the foregoing type is corrected by tilting one of the lenses of the optical system of which the analytic function component is a part. In a further modification, quintic surfaces individually or in combination are placed at conjugate foci in an optical system of which they are a part. In a further modification, two or more quintic pairs of elements are used to provide stabilization of any combination of focal position, focal length, zoom action, longitudinal or lateral color, spherical aberration, coma, astigmatism, Petzval field curvature and distortion. For example, three such pairs can simulate a well corrected triplet for a wide range of object distances in connection with cameras, projectors, copyers and enlargers. Furthermore, any aspheric powers needed in the given optical system often may be transformed by design to be part of a shaped quintic, resulting in spherical surfaces for the system except at the shaped quintic. Since certain changes may be made in the foregoing disclosure without departing from the scope of the invention herein involved, it is intended that all matter described in the foregoing specification and illustrated in the accompanying drawing be interpreted in an illustrative and not in a limiting sense.

What I claim is:

1. An analytic function optical component comprising at least one plate that is disposed along an axis, said plate having one surface of predetermined shape and a quintic surface whose shape is mathematically described by a preselected polynomial equation having a nonzero term of at least fifth order, said plate being movable laterally of said axis so as to affect optical performance characteristics, including spherical aberration, coma, astigmatism and other aberrations of said component and said polynomial equation having at least the term:
$x=ay+cy^3+3cyz^2+gy^5+10/3gy^3z^2+5gyz^4$,
where $x$, $y$, $z$ are coordinate axes having an origin at the vertex of said quintic surface and $a$, $c$, $g$ are constants, $a$ being a constant representing the coefficient of a prism which can be removed to minimize the thickness of said analytic function optical component, $c$ being a constant related to lens power variation with movement in the $y$ direction, and $g$ being a constant selected to superimpose predetermined aspheric power on said analytic function optical component to ameliorate said aberrations.

2. The analytic function optical component of claim 1, wherein said quintic surface, with reference to $x$, $y$, $z$ coordinate axes having an origin at a vertex, is symmetrical with respect to said origin in any plane parallel to the $x$-$y$ plane and is mirror symmetrical in any plane parallel to the $x$-$z$ plane and said predetermined shape is a surface of revolution.

3. An analytic function optical component comprising at least a pair of plates that are disposed in tandem along an axis, said plates each having a surface of an order at least as high as quintic, said plates being relatively movable laterally of said axis in such a way as to affect optical performance characteristics including spherical aberration, coma, astigmatism and other aberrations of said component, each said surface characterized by an expression, containing at least the term:
$x=ay+cy^3+3cyz^2+gy^5+10/3gy^3z^2+5gyz^4$, where $x$, $y$, $z$ are coordinate axes having an origin at the vertex of said one of said surfaces and $a$, $c$, $g$ are constants, $a$ being a constant representing the coefficient of a prism which can be removed to minimize the thickness of said analytic function optical component, $c$ being a constant related to lens power variation with movement in the $y$ direction, and $g$ being a constant selected to superimpose predetermined aspheric power on said analytic function optical component to ameliorate said aberrations 4. An analytic function optical component comprising a plurality of plates that are disposed in tandem along an optic axis, said plates having surfaces that are symmetrical about said optic axis at the vertex thereof and are characterized by a polynomial equation of an order at least as high as quintic, said plates being relatively movable laterally of said axis in such a way to be equivalent in any of their different selected lateral positions to two plano aspheric lenses, with selected dioptric and aspheric powers, having selected curvatures, said polynomial equation characterizing said surfaces containing at least the term;

$x = ay + cy^3 + 3cyz^2 + gy^5 + 10/3 gy^3z^2 + 5gyz^4$, where $x$, $y$, $z$ are coordinate axes having an origin at the vertex of said one of said surfaces, $x$ being parallel to said optic axis, and $a$, $c$, $g$ are constants, $a$ being a constant representing the coefficient of a prism which can be removed to minimize the thickness of said analytic function optical component, $c$ being a constant related to lens power variation with movement in the $y$ direction, and $g$ being a constant selected to superimpose predetermined aspheric power on said analytic function optical component to ameliorate certain optical aberrations.

5. The analytic function optical component of claim 4 wherein said surfaces are disposed at the inner adjacent portions of said plates.

6. The analytic function optical component of claim 4 wherein the remote surfaces of said plates are plano.

7. An optical system comprising an analytic function optical component having at least one plate disposed along an axis, said plate having one surface of predetermined shape and a quintic surface whose shape is mathematically described by a preselected polynomial equation having a nonzero term of at least fifth order, said plate being movable laterally of said axis so as to affect optical performance characteristics including spherical aberration, coma, astigmatism, and other aberrations of said optical system and said polynomial equation describing said quintic surface contains at least the term:

$x = ay + cy^3 + 3cyz^2 + gy^5 + 10/3 gy^3z^2 + 5gyz^4$ wherein $x$, $y$, $z$ are mutually orthogonal coordinate axes having an origin at the vertex of said quintic surface, $x$ being the displacement from said reference plane along said axis, $y$ and $z$ being perpendicular to said axis, $a$ being a constant representing the coefficient of a prism which can be removed to minimize the thickness of said analytic function optical component, $c$ being a constant related to lens power variation with movement in the $y$ direction, and $g$ being a constant selected to superimpose predetermined aspheric power on said analytic function optical component to ameliorate said aberrations.

8. The optical system of claim 7, wherein said analytic function optical component comprises:
first and second of said plates having first and second quintic surface, respectively, in tandem along said axis;
means for moving said plates laterally of said axis in opposite directions, wherein said first quintic surface is positioned proximately of said second quintic surface, said polynomial equation describing said quintic surfaces being positive for said first quintic surface and negative for said second quintic surface.

9. An optical system comprising an analytic function optical component and an optical element disposed along an axis, said analytic function optical component comprising at least one plate disposed along said axis, each of said plates having a surface of predetermined shape and a quintic surface whose shape is mathematically described by a preselected polynomial equation containing at least the term:

$x = ay + cy^3 + 3cyz^2 + gy^5 + 10/3 gy^3z^2 + 5gyz^4$ wherein $x$, $y$, $z$ are mutually orthogonal coordinate axes having an origin at the vertex of said quintic surfaces, $x$ being the displacement from said reference plane along said axis, $y$ and $z$ being perpendicular to said axis, $a$ being a constant representing the coefficient of a prism which can be removed to minimize the thickness of said analytic function optical component, $c$ being a constant related to lens power variation with movement in the $y$ direction, and $g$ being a constant selected to superimpose predetermined aspheric power on said analytic function optical component, said plates being movable laterally of said axis so as to exert control over optical performance characteristics of said optical system, including spherical aberration, coma, astigmatism, and other aberrations of said optical system.

10. The optical system of claim 9, wherein said optical element is a mirror and said analytic function component comprises a single said plate at the center of curvature of said mirror so the mirror image of said quintic surface is in contiguity with said actual quintic surface.

11. The optical system of claim 9, wherein said optical element comprises at least one refracting lens and said analytic function optical component comprises:
first and second of said plates having first and second quintic surfaces, respectively, in tandem along said axis;
means for moving said plates laterally of said axis in opposite directions, wherein said first quintic surface is positioned proximately of said second quintic surface, said polynomial describing said quintic surfaces being positive for said first quintic surface and negative for said second quintic surface.

12. The optical system of claim 9, wherein said coefficients $a$ and $c$ are both equal to zero.

13. The optical system of claim 9, wherein each said surface of predetermined shape of each said plate is plano.

Here $B_7 = +a[9.5$, $B_8 = -a[0.636$ and the back focal distance is given by $d_{10}$.